United States Patent [19]

Yasuda et al.

[11] Patent Number: 5,273,826
[45] Date of Patent: Dec. 28, 1993

[54] MAGNETIC COATING FORMULATIONS AND MAGNETIC RECORDING MEDIA

[75] Inventors: Masahiko Yasuda; Shigeo Hosokawa; Yorozu Yokomori, all of Mie; Shinichiro Jimbo, Tokyo, all of Japan; Edmond G. Kolycheck, Lorain, Ohio

[73] Assignee: The B. F. Goodrich Company, Akron, Ohio

[21] Appl. No.: 40,036

[22] Filed: Mar. 31, 1993

Related U.S. Application Data

[60] Division of Ser. No. 740,398, Aug. 5, 1991, which is a continuation-in-part of Ser. No. 426,132, Oct. 24, 1989, Pat. No. 5,037,934.

[30] Foreign Application Priority Data

Oct. 28, 1988 [JP] Japan .................. 63-271035
May 22, 1989 [JP] Japan .................. 1-126580
Aug. 8, 1989 [JP] Japan .................. 1-203738

[51] Int. Cl.$^5$ .................. C08G 18/30
[52] U.S. Cl. .................. 428/423.1; 428/425.9; 428/694; 523/181; 524/407; 524/408; 524/413; 524/431
[58] Field of Search .................. 428/694, 423.1, 425.9; 523/181; 524/407, 408, 413, 431

[56] References Cited

U.S. PATENT DOCUMENTS

| | | |
|---|---|---|
| 3,350,478 | 1/1967 | Cherbuliez et al. . |
| 3,350,479 | 1/1967 | Cherbuliez et al. . |
| 3,350,480 | 10/1967 | Cherbuliez et al. . |
| 3,350,481 | 10/1967 | Cherbuliez et al. . |
| 3,365,531 | 1/1968 | Cherbuliez et al. . |
| 3,373,231 | 3/1968 | Cherbuliez et al. . |
| 3,374,294 | 3/1968 | Cherbuliez et al. . |
| 4,571,364 | 2/1986 | Kasuga et al. . |
| 4,721,531 | 1/1988 | Wildeman et al. . |
| 4,830,923 | 5/1989 | Sumiya et al. . |
| 5,037,934 | 8/1991 | Yasuda et al. . |
| 5,045,622 | 9/1991 | Kohno et al. . |
| 5,057,373 | 10/1991 | Tokunaga et al. . |
| 5,158,830 | 10/1992 | Yasuda et al. . |

FOREIGN PATENT DOCUMENTS

0148970 7/1985 European Pat. Off. .
0272587 6/1988 European Pat. Off. .

*Primary Examiner*—Maurice J. Welsh
*Attorney, Agent, or Firm*—Debra L. Pawl; Helen A. Odar

[57] ABSTRACT

A polyurethane resin is synthesized from a reaction mixture of at least one phosphorus compound, an epoxy compound, a polyisocyanate, a polyfunctional hydroxy compound, and optionally a chain extender. The polyurethane resin contains one phosphoric acid group or one residual group derived from phosphoric acid per 3,000 to about 200,000 number average molecular weight of the polyurethane resin. The weight average molecular weight of the polyurethane resin is from about 10,000 to about 250,000. A magnetic coating formulation is comprised of principally of magnetic particles and a binder. A magnetic recording media comprises a laminate as in the form of a magnetic layer composed principally of magnetic particles and a binder wherein at least a portion of the binder is the polyurethane resin. The substrate of the magnetic recording medium is a suitable polymer such as polyester, and the like. The utilization of the polyurethane resin containing a phosphorus compound therein results in excellent dispersion of the magnetic particles as well as exceptional durability.

6 Claims, No Drawings

MAGNETIC COATING FORMULATIONS AND MAGNETIC RECORDING MEDIA

CROSS-REFERENCE

This is a division of pending application Ser. No. 07/740,398 filed Aug. 5, 1991, pending which is a continuation-in-part of U.S. patent application Ser. No. 07/426,132 filed Oct. 24, 1989, for "Magnetic Coating Formulations and Magnetic Recording Media" now U.S. Pat. No. 5,037,934.

FIELD OF THE INVENTION

The present invention relates to magnetic coating formulations, and from another viewpoint to magnetic recording media with a magnetic layer formed principally of magnetic particles and a binder. Magnetic recording media can include, for example, magnetic tapes, magnetic disks, magnetic cards and the like.

In general, a magnetic recording medium carries a magnetic layer which has been formed by coating a base film such as a polyester film with a magnetic coating formulation containing magnetic particles and a binder and then drying the thus-coated formulation.

Binders with various resins incorporated therein have conventionally been used as binders for magnetic recording media. Among these, useful are polyurethane resins, vinyl chloride-vinyl acetate copolymer resins, and the like. However, these binders do not have sufficient dispersing capacity of magnetic particles so that they rely in dispersing capacity upon a dispersant such as soybean lecithin or a phosphoric acid compound. A system formed of a binder and a dispersant blended therein however tends to develop deleterious effects, such as bleeding, on the durability of the magnetic layer when used for a long time.

To improve the problems referred to above, binders having high dispersing capacity have been proposed, in which hydrophilic polar groups such as hydroxyl groups, carboxyl groups, phosphoric acid groups, sulfonic acid groups, or the like, have been introduced to improve the affinity to magnetic particles (Japanese Patent Applications Laid-Open Nos. 92422/1982, 30235/1984, 154633/1984, 15473/1985, 20315/1985 and 1110/1987).

With the current technical standard in view, there is an outstanding demand for the development of a magnetic recording medium excellent not only in the dispersion of magnetic particles but also in the durability of the magnetic layer.

No one has however succeeded yet to provide a magnetic recording medium which can satisfy both requirements for magnetic recording media, namely, high dispersion of magnetic particles and at the same time high abrasion resistance (i.e., durability) of the magnetic layer. Further, no magnetic coating formulation useful for the production of such magnetic recording media has been provided yet.

It is an object of the present invention to solve the above problems.

DETAILED DESCRIPTION

It has been found that a magnetic recording medium excellent in the dispersion of magnetic particles can be obtained without impairing the mechanical characteristics of a polyurethane resin when a phosphoric-acid-modified polyurethane resin synthesized by adding a bifunctional isocyanate compound and/or a trifunctional isocyanate compound and a polyfunctional hydroxy compound having a number average molecular weight of 400–5,000, and if desired, a chain extender, to a phosphoric-acid-modified polyol which has been obtained by adding a particular compound containing a phosphoric acid group to an epoxy compound containing at least two epoxy groups and/or an epoxy compound containing one epoxy group and at least one hydroxyl group, and then conducting a urethanation reaction, is used as a binder upon production of the magnetic recording medium, leading to the completion of the present invention.

In addition, the present inventors have also found that use of a phosphoric-acid-modified and epoxy-modified polyurethane resin, which has been synthesized by conducting the urethanation reaction in the presence of an epoxy compound, as a binder results in the provision of a magnetic recording medium having a magnetic layer excellent not only in the dispersion of magnetic particles but also in abrasion resistance and durability owing to the high crosslinking degree of the resin. This finding has also led to the completion of this invention.

The present invention therefore provides a magnetic recording medium which comprises a magnetic layer composed principally of magnetic particles and a binder. At least a portion of the binder is a polyurethane resin synthesized from a reactant mixture of components (1), (2), (3) and (4) and/or (5) set out below, containing one phosphoric acid group or one residual group derived from phosphoric acid per 3,000 to 200,000 number average molecular weight of the polyurethane resin, and having a weight average molecular weight of from about 10,000 to about 350,000, desirably from about 12,000 to about 250,000 and more desirably from about 20,000 to about 150,000, and wherein the polyurethane resin contains phosphoric acid groups or residual groups derived from phosphoric acid and which groups have been at least partly neutralized with a base.

The various components are:

(1) a phosphorus compound (a) represented by a structural formula set out below, or a phosphorus compound (b) represented by a structural formula set out below, or a phosphorus compound (c) represented by a structural formula set forth below:

Phosphorus compound (a): a compound (a₁) alone or a mixture of the compound (a₁) and another compound (a₂):

Compound (a₁):

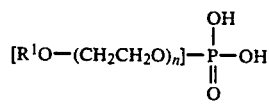

Compound (a₂):

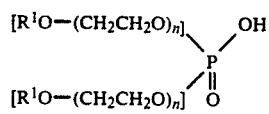

wherein $R^1$ is a hydrogen atom, a phenyl group, an alkyl group having 1–40 carbon atoms, or an alkylphenyl group having 1–40 carbon atoms, and n is an integer of 0–30.

Phosphorus compound (b):

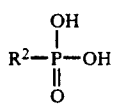

wherein $R^2$ is a phenyl group, an alkyl group having 1-40 carbon atoms, or an alkylphenyl group having 1-40 carbon atoms;

phosphorus compound (c)

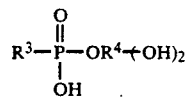

wherein $R^3$ is an aromatic or an alkyl substituted aromatic having from 6 to 40 carbon atoms, and $R^4$ is a disubstituted alkyl having from 1 to 12 carbon atoms, with 2,3-dihydroxypropylphenylphosphonate being preferred;

(2) an epoxy compound having at least two epoxy groups and/or an epoxy compound having one epoxy group and at least one hydroxyl group;

(3) a bifunctional isocyanate compound and/or a trifunctional isocyanate compound; and (4) a polyfunctional hydroxy compound having a number average molecular weight of 400-5,000.

The reactant mixture employed upon synthesis of the binder may further comprise a chain extender as component (5).

The present invention has made it possible to provide magnetic recording media having a magnetic coating layer which features not only excellent dispersion of magnetic particles but also superb durability.

The term "residual group derived from phosphoric acid" as used herein means a residual group of a phosphoric acid ester such as a phosphoric acid monoester, phosphoric acid diester or phosphoric acid triester.

Phosphorus Compound

In the present invention, the compound (a) is either the compound (a₁) alone or a mixture of the compound (a₁) and the compound (a₂). In the case of the mixture, the ratio of the compound (a₁) to the compound (a₂) can range from 100:0 to 10:90. Specific examples include "Gafac RE-410", "Gafac RE-610", "Gafac RE-210", "Gafac RP-710", "Gafac RD-510Y", "Gafac RB-410", "Gafac RS-410", "Gafac RS-610" and "Gafac RB-510", all trade names and products of Toho Chemical Industry Co., Ltd. and GAF Chemicals, as well as monoisodecyl phosphate produced by Daihachi Chemical Industry Co., Ltd. As examples of the compound (b), may be mentioned phenylphosphonic acid, that is

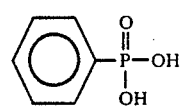

and octylphosphonic acid, both produced by Nissan Chemical Industries, Ltd. An example of compound (c) is

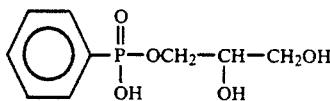

which is the reaction product of

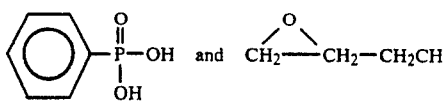

Generally, the reaction between the epoxy compound and the phosphorous compound to produce compound (c) is carried out at a temperature of from about 40° to about 120° C. with from about 45° to about 55° C. being preferred, utilizing a slight excess of epoxy compound, or glycidol, and thus the mole ratio of the phosphoric acid to the epoxy compound is generally from about 0.85 to about 0.95 and desirably from about 0.88 to about 0.92.

Epoxy Compound

General examples of specific epoxy resins or polymers which can be utilized include: polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins.

Exemplary epoxy compounds include "Epicoat 828", "Epicoat 834", "Epicoat 1001", "Epicoat 1002", "Epicoat 1003" and "Epicoat 1004", all trade names for bisphenol A-epichlorohydrin epoxy resins produced by Yuka Shell Epoxy Kabushiki Kaisha; "Epicoat 152" and "Epicoat 154", both trade names for phenolic novolak epoxy resins produced by Yuka Shell Epoxy Kabushiki Kaisha, and "Smiepoxy ELPN-180" and "Smiepoxy ESPN-180", both phenolic novolak epoxy resins produced by Sumitomo Chemical Co., Ltd.; "Smiepoxy ESCN-220L", "Smiepoxy 220F", "Smiepoxy 220HH" and "Smiepoxy ESMN-220L", all trade names for cresolic novolak epoxy resins produced by Sumitomo Chemical Co., Ltd., "EOCN-102", "EOCN-103"and "EOCN-104", all trade names for cresolic novolak epoxy resins produced by Nippon Kayaku Co., Ltd., "Epicoat 180S", trade name for a cresolic novolak epoxy resin produced by Yuka Shell Epoxy Kabushiki Kaisha; "Epicoat 604", trade name for a tetrafunctional epoxy resin of the glycidyl amine type produced by Yuka Shell Epoxy Kabushiki Kaisha; diethylene glycol diglycidyl ether. bisphenol A diglycidyl ether; spiroglycol diglycidyl ether; diglycidyl adipate; triglycidyl trihydroxyethyl isocyanurate; pentaerythritol polyglycidyl ether; diglycidyl terephthalate; diglycidyl orthophthalate; neopentyl glycol diglycidyl ether; dibromoneopentyl glycol diglycidyl ether; 1,6-hexanediol diglycidyl ether; sorbitol polyglycidyl ether; glycerol diglycidyl ether; diglycerol diglycidyl ether; glycerol triglycidyl ether; trimethylolpropane diglycidyl ether; trimethylolpropane triglycidyl ether; diglycerol triglycidyl ether; vinylcyclohexene dioxide; dicyclopentadiene dioxide; 3,4-epoxy-6-methylcyclohexylmethyl 3,4 -epoxy-6-methylcyclohexanecarbonate; alicyclic diepoxy adipate; diglycidyl tetrahydrophthalate; diglycidyl hexahydrophthalate; diglycidylparaoxybenzoic acid; trihydroxybiphenyl triglycidyl ether; tetraglycidylbenzophenone; bisresorcinol tetraglycidyl ether; bisphenol hexafluoroacetone diglycidyl ether; 1,1-bis[4'-(2,3-epoxypropoxy)phenyl]cyclohexane; hydroxydicyclopentadiene monoxide; bis(3,4-epoxy-6-methyl-cyclohexylmethyl) adipate; and 3,4-epoxycyclohexylmethyl 3,4-epoxycyclohexanecarboxylate. As a monofunctional epoxy compound, may be mentioned glycidol (2,3-epoxy-1-propanol) produced by Nippon Oil & Fats Co., Ltd.

Phosphoric-Acid-Modified Polyol

In the present invention, the phosphoric-acid-modified polyol can be obtained by reacting an epoxy compound, e.g. the above (2) compound, and the above (1a) or (1b) phosphorous compound at 40° to 120° C., preferably at 60°-100° C. in the presence or absence of a solvent. Moreover, a modified phosphoric acid compound can also be made by reacting an epoxy with compound (1c) but the same can be readily purchased as a reacted end product. It is important solvents be utilized in which the phosphoric acid modified polyol is soluble. Such solvents are generally polar.

Exemplary solvents usable for the preparation of the phosphoric acid modified polyol include ketones, and ketones in combination with aromatics, e.g., acetone, methyl ethyl ketone, methyl isobutyl ketone, and cyclohexanone; esters, e.g., methyl acetate, ethyl acetate, and butyl acetate; glycol ethers, e.g., dioxane; the acetate esters of glycol ethers, aliphatic hydrocarbons, e.g., nitropropane; tetrahydrofuran; dimethylacetamide; and dimethylformamide.

Preferred solvents include methyl ethyl ketone, methyl isobutyl ketone, cyclohexanone, tetrahydrofuran, and combinations thereof.

Regarding the charge ratio of the compound (a) or (b) to the epoxy compound, 2:1 molar ratio is preferred for the compound (a) while 1:1 molar ratio is preferred for the compound (b). Generally, the ratio of the phosphorous compound to the epoxy compound is from about 1.8 to about 2.1 for compound (a), and from about 0.9 to about 1.1 for compound (b). However, the epoxy compound may be charged in excess. Further, the above reaction may be conducted in the presence of the polyfunctional polyol and/or a chain extender.

Isocyanate Compound

As the isocyanate compound, a diisocyanate or small amounts of a triisocyanate, in which the hydrocarbon portion thereof is an aliphatic, an aromatic, or combinations thereof having a total of from 4 to 22 carbons, can be utilized such as the following specific examples:

2,4-tolylene diisocyanate (may be abbreviated as "TDI"); 2,6-tolylene diisocyanate; diphenylmethane diisocyanate (may be abbreviated as "MDI"); m-phenylene diisocyanate; tetramethylene diisocyanate; 3,3'-dimethoxy-4,4'-biphenylene diisocyanate; 3,3'-dimethyl-4,4'-biphenylene diisocyanate; 4,4'-diphenylene diisocyanate; paraphenylene diisocyanate; 4,4'-diisocyanato diphenyl ether; 1,5-naphthalene diisocyanate; p-xylylene diisocyanate; m-xylylene diisocyanate; 1,3-diisocyanato methyl-cyclohexane; 1,4-diisocyanato methylcyclohexane; 4,4'-diisocyanato dicyclohexane; 4,4'-diisocyanato dicyclohexylmethane; and isophorone diisocyanate.

If necessary, 2,4,4'-triisocyanato diphenyl, benzene triisocyanate or the like can also be used in a small amount. Whenever triisocyanates are utilized, they are utilized in small amounts, for example, less than 20% and desirably less than 10% by weight based upon the total weight of all of the polyisocyanates so that crosslinking generally does not occur.

Polyfunctional Hydroxy Compound

A polyester polyol, a polyether polyol, polycarbonate polyol, Dianol 22®, i.e. ethanol-2,2'-[(1-methylethylidene)bis(4,1-phenyleneoxy)]bis, or the like can be used as the polyfunctional hydroxy compound, namely, polyol in the present invention.

Exemplary polyester polyols include those made from glycols having a total of from 2 to 8 carbon atoms and dicarboxylic acids having a total of from 2 to 20 carbon atoms with specific examples of glycols including ethylene glycol, propylene glycol, butylene glycol, hexylene glycol, and the like, and specific examples of acids including malonic acid, succinic acid, glutaric acid, adipic acid, pimelic acid, suberic acid, azelaic acid, sebacic acid, and the like. Examples of specific polyester polyols thus include polyethylene adipate polyols, polybutylene adipate polyols, polyethylenepropylene adipate polyols, cyclohexane dimethanol adipate, various azelate polyols, terephthalic acid polyols, e.g., "Vyron RUX" and "Vyron RV-200", both trade names and produced by Toyobo Co., Ltd.; isophthalic acid polyols such as neopentyl isophthalic acid polyols, polycaprolactone polyols, e.g., "Placcel 212", "Placcel 220", "Placcel 208" and "Placcel 210", all trade names and produced by Daicel Chemical Industries, Ltd.

On the other hand, usable exemplary polyether polyols include polyoxyethylene glycol; polyoxypropylene glycol; polyoxyethylene polyoxypropylene polyols; and polyoxytetramethylene polyols. Still other examples of polyether polyols include copolyethers of THF/ethyleneoxide, and copolyethers of THF/propylene oxide which can either be block copolymers or random copolymers.

Other usable illustrative polyfunctional hydroxy compounds include polycarbonate polyols, e.g., "Desmophen 2020E" (trade name, product of Bayer AG, W. Germany), and "Carbodiol D-1000" and "Carbodiol D-2000" (trade names, products of Toagosei Chemical Industry Co., Ltd.); polybutadiene polyols, e.g., "G-1000", "G- 2000" and "G-3000" (trade names, products of Nippon Soda Co., Ltd.); 3-methyl-1,5-pentane adipate polyols, e.g., "PMPA 1000" and "PMPA 2000" (trade names, products of Kuraray Co., Ltd.); polypentadiene polyols; and methyl-δ-valerolactone polyols, e.g., "PMVL 1000" and "PMVL 2000" (trade names, products of Kuraray Co., Ltd.), and ethanol-2,2'-[(1-methylethylidene) bis(4,1-phenyleneoxy)]bis (Dianol 22).

U.S. Pat. No. 4,131,731 is hereby incorporated by reference for its disclosure of hydroxyl terminated polycarbonates and their preparation. Such polycarbonates are linear and have terminal hydroxyl groups with essential exclusion of the terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, heptanediol-1,7, octanediol-1,8, 2-ethylhexanediol-1,6, 2,2,4-trimethylhexanediol-1,6, decanediol-1,10 hydrogenated dilinoleylglycol, hydrogenated dioleylglycol and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Suitable carbonates are selected from alkylene carbonates composed of a 5 to 7 membered ring having the following general formula:

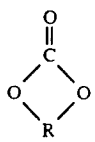

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° to 300° C., preferably at 150° to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are turned to the reaction vessel as reflux. A current of inert gas or an inert solvent can be used to facilitate removal of by-product glycol as it is formed. When amount of by-product glycol obtained indicates that degree of polymerization of the hydroxy terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° to 300° C., preferably 150° to 250° C., and at a pressure of 0.1 to 10 mm Hg until the desired molecular weight of the hydroxyl terminated polycarbonate is attained. Molecular weight of the hydroxyl terminated polycarbonates can vary from about 500 to about 10,000 but in a preferred embodiment, it will be in the range of 500 to 2500.

The above different types of polyols can be used either singly or in combination and generally have a molecular weight by end group analysis of from about 300 to about 10,000, and desirably from about 300 to about 4,000.

Chain Extender

Exemplary chain extenders include bifunctional to hexafunctional polyols having a molecular weight of 500 or lower as well as diamines and alkanolamines containing one or two terminal primary or secondary amino groups and having a molecular weight of 500 or lower. It is, however, an important aspect of the present invention to generally use only essentially difunctional chain extenders inasmuch as crosslinking is avoided before the polyurethane is formulated and applied to the base film. By the term "essentially difunctional," it is meant a chain extender or blend thereof, wherein the equivalent functionality is from about 1.8 to about 2.2. Moreover, only specific types of chain extenders are desirably utilized which are soluble in the above-noted solvent systems.

Suitable illustrative chain extenders thus include the following compounds:

(a) Diols: ethylene glycol, diethylene glycol, propylene glycol, dipropylene glycol, 1,4-butylene glycol, 1,3-butanediol, 1,6-hexylene glycol, 3-methyl-3-hydroxy-1,5-pentanediol, sorbitol, 1,4-cyclohexanediol, 1,4-cyclohexane-dimethanol, xylylene glycol, neopentyl glycol, 3-methyl-1,5-pentanediol, 2-ethyl-1,3-hexanediol, 3-methyl-1,3-butanediol, and combinations thereof. Preferred polyol chain extenders include 1,3-butanediol, neopentyl glycol, 3-methyl-1,5-pentanediol, 2-ethyl-1,3-hexanediol, 3-methyl-1,3-butanediol, and dianol.

(b) Diamines can be utilized but generally in solvents in which they have good solubility such as isopropyl alcohol with specific examples of diamines including hydrazine, ethylenediamine, tetramethylenediamine, hexamethylenediamine, and 1,4-cyclohexanediamine.

(c) Hydroquinone, pyrogallol, 4,4-isopropylidenediphenol, bisphenol A and polyols obtained by adding propylene oxide and/or ethylene oxide in an arbitrary order to the above-described polyols and having a molecular weight of 500 or lower can also be utilized.

(d) Dihydroxycarboxylic acids such as 2,2-dimethylol-propionic acid and tartaric acid can also be utilized.

Urethanation Reaction

In the presence or absence of a solvent, the bifunctional isocyanate compound and/or the trifunctional isocyanate compound (in small amounts) and the polyfunctional hydroxy compound having the number average molecular weight of 400-5,000 and if necessary the chain extender are added to the already phosphoric-acid-modified polyol. In a manner known per se in the art, they are thereafter subjected to the urethanation reaction by the one-shot process or the prepolymer process, thereby synthesizing the phosphoric-acid-modified polyurethane resin. In the reaction, a urethanation catalyst such as di-n-butyltin dilaurate, stannous octate or triethylenediamine can also be used.

Further, a phosphoric-acid-modified and epoxy-modified resin having a more highly branched structure and a higher hydroxyl content can be produced provided that an epoxy compound having at least two epoxy groups and/or an epoxy compound having one epoxy group and at least one hydroxy group is added upon conducting the urethanation reaction.

When the epoxy compound is added, the reaction temperature of the urethanation may be 50°-160° C., preferably 70°-150° C. in the absence of a solvent.

In addition, upon production of the phosphoric-acid-modified polyol described above, the epoxy compound can be added in an excess amount to leave a portion of the epoxy compound or epoxy groups unreacted.

The phosphoric-acid-modified polyurethane resin synthesized as described above generally has a high crosslink density and a high hydroxyl content. Hydroxyl groups in its molecular chain or at its molecular terminals react with the polyfunctional low-molecular isocyanate compound during a drying step of a resulting magnetic coating formulation, thereby making it possible to obtain a magnetic recording medium with a magnetic coating layer having a still higher crosslink density and excellent abrasion resistance and durability.

Illustrative reaction solvents include generally polar solvents such as ketones, ethers, and the like, with preferred solvents including tetrahydrofuran, methyl ethyl ketone, methyl isobutyl ketone, cyclohexanone, dimethylformamide, blends of methyl ethyl ketone with toluene, and the like. These solvents can be used either singly or in combination.

Polyurethane Resin

The number average molecular weight of the polyurethane resin in this invention can be from about 4,000 to about 150,000; and preferably from about 5,000 to about 60,000. The weight average molecular weight of the polyurethane resin is generally from about 10,000 to about 350,000, desirably from about 12,000 to about 250,000, and preferably from about 20,000 to about 150,000. If this weight average molecular weight is too low, it will be difficult to draw out sufficient effects for the improvement of the durability of the magnetic coating layer. On the other hand, unduly high number average molecular weights will lead to inconvenience such that the resulting magnetic coating formulation will have a high viscosity.

Incidentally, phosphoric acid groups or residual groups derived from phosphoric acid, which are contained in the polyurethane resin useful in the practice of this invention, may be neutralized with a base either in part or in toto.

The base may be any organic base or inorganic base insofar as it can neutralize phosphoric acid groups or residual groups derived from phosphoric acid. Such organic and inorganic bases can be used either singly or in combination.

Exemplary inorganic bases include lithium hydroxide, sodium hydroxide, potassium hydroxide and ammonia.

On the other hand, illustrative organic bases include amines and derivatives thereof, such as monomethylamine, dimethylamine, trimethylamine, monoethylamine, diethylamine, triethylamine, tributylamine, trioctylamine, tridecylamine, dimethylethanolamine, monoethanolamine, diethanolamine, triethanolamine, morpholine, pyridine, piperazine, piperidine, aniline, dimethylaniline and picoline; hindered amines such as dimethyl succinate-1-(2-hydroxyethyl)-4-hydroxy-2,2,6,6-tetramethylpiperidine polycondensation product; cationic polymers such as polyvinylamine; and quaternary ammonium hydroxide such as dodecyldiethylpropylammonium hydroxide. Other neutralizing compounds generally include the various piperidine derivatives as well as various piperadinone derivatives.

The piperidine derivatives include 2,2,6,6-tetramethyl piperidine derivatives [i.e., 4-acetoxy-2,2,6,6-tetramethylpiperidine, 4-stearoyloxy-2,2,6,6-tetramethylpiperidine,4-benzoyloxy-2,2,6,6-tetramethyl piperidine, 4-acryloyl-2,2,6,6-tetramethyl piperidine, 4-(phenylcarbamoyloxy)-2,2,6,6-tetramethyl piperidine, 4-phenoxy-2,2,6,6-tetramethyl piperidine, 4-benzyloxy-2,2,6,6-tetramethylpiperidine,4-cyclohexyloxy-2,2,6,6-tetramethyl piperidine, 4-methoxy-2,2,6,6-tetramethyl piperidine, 4-(p-chlorobenzoyloxy)-2,2,6,6-tetramethyl piperidine, bis(2,2,6,6-tetramethyl-4-piperidyl) oxalate, bis(2,2,6,6-tetramethyl-4-piperidyl) sebacate [i.e., Sanol LS-770: Sankyo Kabushiki Kaisha, trade name], bis(2,2,6,6-tetramethyl-4-piperidyl) adipate, bis(2,2,6,6-tetramethyl-4-piperidyl) malonate, bis(2,2,6,6-tetramethyl-4-piperidyl) terephthalate, bis(2,2,6,6-tetramethyl-4-piperidyl) hexamethylene-1,6-dicarbamate, 1,2-bis(2,2,6,6-tetramethyl-4-piperidyloxy)-ethane, α,α-bis(2,2,6,6-tetramethyl-4-piperidyloxy)-p-xylene, tris(2,2,6,6-tetramethyl-4-piperidyl) benzene-1,3,5-tricarboxylate, tetra(2,2,6,6-tetramethyl-4-piperidyl) butane-1,2,3,4-tetracarboxylate, poly[{6-ammonia.(1,1,3,3-tetramethylbutyl) imino-1,3,5-triazine-2,4-diyl}{(2,2,6,6-tetramethyl-4-piperidyl) imino) hexamethylene {(2,2,6,6-tetramethyl-4-piperidyl imino}][sic] etc.; and the 6,6-pentamethylpiperidine derivatives are bis(1,2,2,6,6-pentamethyl-4-piperidyl) sebacate,2-(3,5-t-butyl-4-hydroxybenzyl)-2-n-butylmalonate bis(1,2,2,6,6-pentamethyl-4-piperidyl) [i.e., Tinuvin 144: Ciba-Geigy, trade name], N,N-bis-(3-aminopropyl) ethylenediamine-2, and 4-[1,2,2,6,6'-pentamethyl-4-piperidyl) amino)]-6-chloro-1,3,5-triazine mixture. These piperidine derivatives are commercial products or compounds found in the literature (Kokai Sho59-30850).

Examples of piperadinone derivatives are $N^1$-propyl-3,3,5,5-tetramethyl-2-piperadinone,$N^1$-isopropyl-3,3,5,5-tetramethyl-2-piperadinone, $N^1$-dodecyl-3,3,5,5-tetramethyl-2-piperadinone, $N^1$-t-octyl-3,3,5,5-tetramethyl-2-piperadinone, 1,2-ethane-bis-($N^1$-t-3,3,5,5- tetramethyl-2-piperadinone), (i.e., GR-3034: BFGoodrich Co.; trade name), $N^4$-t-octyl-3,3,6,6-tetramethyl-2-piperadinone, $N^1$-phenyl-3,3,5,5-tetramethyl-2-piperadinone, $N^1$-t-butyl-3,3-dimethyl 5,5-pentamethylene-2-piperadinone, 2,4,6-tris(cyclohexyl[2-(3,3,5,5-tetramethyl-2-oxo-1-piperadinyl) ethyl]amino)-1,3,5-triazine, etc. The piperadinone derivatives are commercial products and compounds found in the literature (Kokai Sho 54-56987).

When a polyurethane resin obtained in a neutralized form by using these bases either singly or in combination is employed as a binder, a modified interaction can be developed between the binder and the surfaces of magnetic particles. Still better dispersing capacity can be obtained depending on the kind of the magnetic particles.

In the case of a urethane resin of the polyester type, the neutralization of acidic groups makes it possible to prevent deterioration of the resin which would otherwise take place when stored over a long period of time.

Although these polyurethane resins are extremely effective binders by themselves, they can be used in combination with one or more of various materials conventionally known as binders for magnetic coating layers. Specific examples of binders usable in combination with the aforementioned polyurethane resins include phosphoric-acid-unmodified polyurethane resins, phenoxy resins, cellulose resins, epoxy resins, vinyl chloride-vinyl acetate copolymer resins, vinylidene chloride resins, polyester resins, polyvinyl butyryl resins, and chlorinated vinyl chloride resins.

In addition, binders, generally in the form of crosslinking agents, also usable in combination with the polyurethane resins include polyisocyanate compounds which generally function as crosslinking components. Among these, trifunctional low-molecular isocyanate compounds are particularly preferred. As examples of such isocyanate compounds, may be mentioned "Colonate L" (trade name, product of Nippon Polyurethane Industry Co., Ltd.), "Desmodule L" (trade name, product of Bayer AG), and "Takenate D102" (trade name, product of Takeda Chemical Industries, Ltd.).

As to the content of phosphoric acid groups or residual groups derived from phosphoric acid, which are contained in the polyurethane resin, one phosphoric acid group or one residual group derived from phosphoric acid must be contained per 3,000 to 200,000, desirably from 10,000 to 200,000, preferably 5,000 to 40,000 weight average molecular weight of the polyurethane resin. No favorable effects can be expected for the improvement of the dispersibility of magnetic particles if the content is lower than the lower limit or higher than the upper limit.

Production Process of Magnetic Recording Medium

Production of the magnetic recording medium according to the present invention can be conducted in a similar manner to either one of conventional processes. For example, the binder, magnetic particles and if necessary, one or more of various additives are mixed together with an organic solvent to prepare a magnetic coating formulation. A base film such as a polyester film is then coated with the magnetic coating formulation. After drying, a surface treatment such as calender rolling is applied.

As the magnetic particles, gamma-$Fe_2O_3$, mixed crystals of gamma-$Fe_2O_3$ and $Fe_3O_4$, cobalt-doped gamma-$Fe_2O_3$ and $Fe_2O_3$, $CrO_2$, barium ferrite, pure iron, other ferro-magnetic alloy particles (e.g., Fe—Co, Co—Ni, Fe—Co—Ni, Fe—Co—B, Fe—Co—Cr—B, Mn—Bi, Mn—Al, Fe—Co—V), iron nitride and other similar magnetic particles are all usable.

As additives which can be added to the magnetic coating formulation as needed, a variety of materials conventionally known as additives for magnetic coating formulations can be suitably used, such as lubricants, abrasives, dispersants, antistatic agents and fillers.

The present invention will hereinafter be described specifically by the following examples. It should however be borne in mind that the present invention is not limited to the following examples only.

EXAMPLE A

Preparation of 2,3-dihydroxypropyl phenylphosphonate (DHAPP)

A 1-liter 3-necked round bottom flask equipped with a mechanical stirrer, addition funnel, condenser, thermocouple with Athena temperature controller, and nitrogen inlet was charged with phenylphosphonic acid (PPA) (158.1 grams; 1.0 mol) and THF (158 grams). The pot was heated to 50° C. A solution of glycidol (81.5 grams; 1.1 mol) in THF (81.5 grams) was added dropwise over a period of 90 minutes (the rate was about 80–84 drops/min.). During the addition, the temperature increased to a maximum of 58° C. When the addition was completed, the temperature cooled to 50° C., and was maintained at 50° C. for 90 minutes, then allowed to cool overnight. A slow nitrogen purge was maintained throughout the reaction.

On day two, it was noted that the reaction solution contained some fine, insoluble, suspended particulates. The solution was filtered through a glass fitted Buchner funnel (disk pore diameter 10–20μ). The solvent was removed on a rotary evaporator giving the DHAPP as a slightly turbid, viscous liquid. Acid number: 244. Brookfield viscosity: 188,000 cps @ 25 C.

EXAMPLE B

A flask was charged with 324.8 grams of Dianol 22 (molecular weight: 316), 2.9 grams of DHAPP from Example A (molecular weight: 121), 4.82 grams of Tinuvin 765 and 226.3 grams of MDI (mol. wt. 250). The contents were then heated to 110° C. and reacted for two minutes. The resin had an hydroxyl number of 30.73, weight average molecular weight of 16,644, Brookfield viscosity [35 percent total solids in cyclohexanone/toluene (50/50 percent by weight)] of 965 centiposes and glass transition temperature of 102° C.

EXAMPLE 1

A 2 L flask equipped with a thermometer, a stirrer, a nitrogen gas inlet tube and a reflux condenser. was charged with 316 g of phenylphosphonic acid (product of Nissan Chemical Industries, Ltd.) and 316 g of methyl ethyl ketone, followed by the dropwise addition of a solution of 372 g of "Epicoat 828" (trade name, product of Yuka Shell Epoxy Kabushiki Kaisha, epoxy equivalent: 186) in the same amount of methyl ethyl ketone at 70° C. over 30 minutes. They were reacted at 70° C. for 5 hours.

Thereafter, the solvent was driven off by a rotary evaporator to obtain a viscous reaction product having an acid value of 160.

EXAMPLE 2

A reaction product having an acid value of 184 was obtained in a similar manner to Example 1 except that 306 g of diglycidyl adipate (trade name: "Dinacol EX701", product of Nagase Chemical, Ltd., epoxy equivalent: 153) were used in place of "Epicoat 828."

EXAMPLE 3

A reaction product having an acid value of 195 was obtained in a similar manner to Example I except that 252 q of 3,4-epoxycyclohexylmethyl 3,4-epoxycyclohexanecarboxylate (trade name: "Chissonox CX221," product of Chissao Corporation) were used instead of "Epicoat 828."

EXAMPLE 4

A reaction product having an acid value of 42.4 was obtained in a similar manner to Example 1 except that 764 g of "Gafac RE610" (trade name, product of Toho Chemical Industry Co., Ltd.) and 200 g of "Epicoat 1001" (trade name, product of Yuka Shell Epoxy Kabushiki Kaisha, epoxy equivalent: 470) were used in lieu of phenylphosphonic acid and "Epicoat 828," respectively and the reaction was conducted at 60° C. for 3 hours.

EXAMPLE 5

A reaction product having an acid value of 48.5. was obtained in a similar manner to Example 4 except that 321.7 g of a monoester derivative (purity: 95 percent) of "Gafac RE610" and 200 g of "Epicoat 100" were charged and the reaction was conducted at 60° C. for hours.

EXAMPLE 6

A reaction product having an acid value of 7.2 was obtained in a similar manner to Example 4 except that 100 g of tetraglycidylbenzophenone were used instead of "Epicoat 1001" and the reaction was conducted at 60° C. for 2 hours.

EXAMPLE 7

A reaction product having an acid value of 45.0 was obtained in a similar manner to Example 4 except that the amount of "Gafac RE610" was reduced from 764 g to 718 g, 144 g of the phenol novolak type "Epicoat 154" (trade name, product of Yuka Shell Epoxy Kabushiki Kaisha, epoxy equivalent: 180) were used in lieu of "Epicoat 1001" and the reaction was conducted at 70° C.

EXAMPLE 8

A reaction product having an acid value of 46.2 was obtained in a similar manner to Example 4 except that 696 g of "Gafac RS610" (trade name, product of Toho Chemical Industry Co., Ltd.) and 50 g of diglycidyl orthophthalate (trade name: "Dinacol EX721," product of Nagase Chemicals, Ltd.) were used in place of "Gafac RE610" and "Epicoat 1001," respectively.

EXAMPLE 9

A reaction product having an acid value of 75.8 was obtained in a similar manner to Example 4 except that 595 g of "Gafac RE410" (trade name, product of Toho Chemical Industry Co., Ltd.) and 75.6 g of glycerol triglycidyl ester (trade name: "Dinacol EX314," product of Nagase Chemicals, Ltd.) were used in place of "Gafac RE610" and Epicoat 1001," respectively and the reaction was conducted at 50° C. for 2 hours.

EXAMPLE 10

A reaction product having an acid value of 71.3 was obtained in a similar manner to Example 9 except that 102 g of sorbitol polyglycidyl ether (trade name: "Dinacol EX611," product of Nagase Chemicals, Ltd.) were used in lieu of and "Dinacol EX314" and the reaction was conducted at 50° C. for 3 hours.

EXAMPLE 11

A flask as in Example 1 was charged with 595 g of "Gafac RE410" and 93 g of "Epicoat 828." They were reacted at 100° C. for 30 minutes to obtain a reaction product having an acid value of 72.9.

EXAMPLE 12

A reaction product having an acid value of 50.2 was obtained in a similar manner to Example 11 except that 718 g of "Gafac RE610" were used instead of "Gafac RE410," the amount of "Epicoat 828" was reduced from 93 g to 74.4 g, and the reaction was conducted at 70° C. for 2 hours.

EXAMPLE 13

A flask as in Example 1 was charged with 158.1 g of phenylphosphonic acid and 632 g of tetrahydrofuran, followed by the dropwise addition of a solution of 74.1 q of glycidol in 296.4 g of tetrahydrofuran at 50° C. over about 2 hours. They were reacted at 50° C. for 1 hour. After confirming the elimination of a spot of glycidol as the raw material by thin layer chromatography on silica gel ("Merck Art 5715," trade name, developer: 1:1 mixed solvent of chloroform and methanol), the solvent was distilled out under reduced pressure from the reaction mixture to obtain a viscous reaction product having an acid value of 280.

EXAMPLE 14

A 1 L separable flask equipped with a thermometer, a stirrer, a nitrogen gas inlet tube and a reflux condenser was charged with 100.9 g of poly(1,4-butylene adipate) (molecular weight: 1,000), 7.3 g of 1,4-butylene glycol, 9.2 g of the reaction product obtained in Example 4, 45.0 g of MDI, 270 g of tetrahydrofuran and 270 g of toluene. After reacting the ingredients at 80°–85° C. for 12 hours, 100 g of methyl ethyl ketone were added to adjust the solid content to 20 percent.

The resulting phosphoric-acid-modified polyurethane resin had an acid value of 2.2 (polymer) and a number average molecular weight of 39,000.

After mixing and kneading 750 g of the phosphoric-acid-modified polyurethane resin solution, 600 g of cobalt-modified Y-$Fe_2O_3$ (trade name: "AX-3000," product of Titan Kogyo K.K., specific surface area: 31 $m^2/g$), 350 g of cyclohexanone and 650 g of methyl ethyl ketone for 72 hours in a ball mill, 20 g of "Desmodule L" were added. The resultant mixture was mixed and kneaded for an additional 30 minutes, thereby obtaining a magnetic coating formulation.

A polyester film having a thickness of 9 μm was coated with the magnetic coating formulation to give a coating thickness of 4 μm after drying, followed by drying at 90° C. for 8 hours. The film thus coated Was then slit 4.0 mm wide into magnetic tapes.

EXAMPLE 15

A 1 L separable flask equipped with a thermometer, a stirrer and a nitrogen gas inlet tube was charged with 294.6 g of "PTG-1000" (trade name for polyether polyol produced by Hodogaya Chemical Co., Ltd., molecular weight: 1,000), 16.3 g of 1,4-butylene glycol, 18.9 g of neopentyl glycol and 24.9 of the reaction product obtained in Example 12. After heating the contents to 80° C., 162.9 g of MDI which had been heated to 80° C. were added. The resultant mixture was vigorously stirred for 5 minutes and transferred into a vat, in which the mixture was allowed to age at 120° C. for 10 hours.

The resultant resin had an acid value of 1.9 and a number average molecular weight of 45,000 and was in a solid form. It was dissolved in methyl ethyl ketone to give a solid content of 20 percent, thereby providing a resin solution.

Magnetic tapes were then produced in a similar manner to Example 14.

EXAMPLE 16

A flask as in Example 15 was charged with 18.9 g of poly(1,4-butylene adipate) (Molecular weight: 1,000), 23.1 of 1,4-butylene glycol and 15.7 g of the reaction product obtained in Example 5. The contents were heated to 110° C.

Thereafter, 142.2 g of MDI which had been heated to 110° C. were added into the flask, followed by vigorous stirring for 3 minutes. During the stirring, the reaction temperature arose to 220-230° C. because of heat of the reaction. The reaction mixture was transferred into a vat, in which it was allowed to age at 60° C. for 10 hours. The resin thus obtained had an acid value of 1.6 and a number average molecular weight of 48,000 and was in a solid form. It was dissolved in methyl ethyl ketone to give a solid content of 20 percent, thereby providing a resin solution.

Magnetic tapes were then produced in a similar manner to Example 14.

EXAMPLE 17

Using 263.5 g of poly(i,4-butylene adipate) (Molecular weight: 2,000), 22.1 g of 1,4-butylene glycol, 22.7 g of 1,6-hexylene glycol, 31.1 g of "Epicoat 828," 6.2 g of the reaction product obtained in Example 1 and 154.4 g of MDI, a solid resin having an acid value of 2.0 and a number average molecular weight of 58,000 was obtained in a similar manner to Example 15. It was dissolved in methyl ethyl ketone to give a solid content of 20 percent, thereby providing a resin solution. Magnetic tapes were then produced in a similar manner to Example 14.

EXAMPLE 18

A flask as in Example 15 was charged with 297.1 g of poly(1,4-cyclohexane dimethanol adipate) (molecular weight: 1,000), 15.0 g of 1,6-hexylene glycol, 13.2 g of neopentyl glycol, 25.3 g of "Epicoat 1001" and 18.3 g of the reaction product obtained in Example 11. After heating the contents to 110° C., 136.9 g of MDI were added and reacted under similar conditions to Example 16.

The reaction mixture was transferred into a vat and was then allowed to cool down. Thereafter, it was allowed to age at 60° C. for 10 hours. The resin thus obtained had an acid value of I.8 and a number average molecular weight of 52,000 and was in a solid form. It was dissolved in methyl ethyl ketone to give a solid content of 20 percent, thereby providing a resin solution.

Magnetic tapes were then produced in a similar manner to Example 14.

EXAMPLE 19

A flask as in Example 15 was charged at 70° C. with 261.4 g of poly(1,4-butylene adipate) (molecular weight: 2,000), 25.9 g of 1,6-hexylene glycol, 22.8 g of neopentyl glycol, 32.4 g of diethylene glycol diglycidyl ether (trade name: "YED 205," product of Yuka Shell Epoxy Kabushiki Kaisha, aliphatic epoxy compound, epoxy equivalent: 140) and 10.1 g of "Gafac RE-410" (phosphoric acid ester produced by Toho chemical Industry Co., Ltd.). The contents were heated to 110° C. over about 10 minutes.

Thereafter, under similar conditions to Example 16, 147.4 g of MDI were added and reacted and the reaction mixture was allowed to age.

The resin thus obtained had an acid value of 1.8 and a number average molecular weight of 47,000 and was in a solid form. It was dissolved in methyl ethyl ketone to give a solid content of 20 percent, thereby providing a resin solution.

Magnetic tapes were then produced in a similar manner to Example 14.

EXAMPLE 20

30 A flask as in Example 14 was charged with 640 g of methyl ethyl ketone, 100.5 g of poly(1, 4-butylene adipate) (molecular weight: 1,000), 8.4 g of neopentyl glycol, 0.8 of "Epicoat 828" and 3.2 g of "Gafac RE410." They were reacted at 78° C. for 3 hours. MDI (47.1 g) was added further, followed by a reaction at 78° C. for 15 hours. The resultant resin solution had a solid content of 20 percent. The polymer had an acid value of 1.9 and a number average molecular weight of 45,000.

Magnetic tapes were then produced in a similar manner to Example 14.

EXAMPLE 21

A flask as in Example 15 was charged at 70° C. with 290.6 g of polycarbonate polyol (product of Toagosei Chemical Industry Co., Ltd.), 16.1 g of 1,4-butylene glycol, 18.6 g of 1,6-hexylene glycol, 2.5 g of "Epicoat 828" and 11.3 of "Gafac RS-410" (product of Toho Chemical Industry Co., Ltd.). After heating the contents to 110° C. over 10 minutes, the reaction mixture was allowed to age at 100° C. for 10 minutes.

Similarly to Example 16, 160.8 g of MDI were then added and reacted and the reaction mixture was allowed to age.

The resultant resin had an acid value of 2.0 and a number average molecular weight of 45,000 and was in a solid form. It was dissolved in methyl ethyl ketone to give a solid content of 20 percent, thereby providing a resin solution.

Magnetic tapes were then produced in a similar manner to Example 14.

EXAMPLE 22

In a similar manner to Example 14, a phosphoric-acid modified polyurethane resin solution was prepared. It was neutralized with caustic potash in an amount equivalent to the acid value.

The solution was diluted with methyl ethyl ketone to give a solid content of 20 percent. Magnetic tapes were then produced in a similar manner to Example 14.

EXAMPLE 23

Using 281.1 g of poly(1,4-butylene adipate) (molecular weight: 1,000), 12.2 g of 1,4-butylene glycol, 21.2 g of neopentyl glycol, 29.2 g of the reaction product obtained in Example 11 and 156.2 g of MDI, a solid resin having an acid value of 5.5 and a number average molecular weight of 45,000 was obtained in a similar manner to Example 16.

Magnetic tapes were then produced in a similar manner to Example 14.

EXAMPLE 24

A flask as in Example 14 was charged with 94.6 g of poly(1, 4-butylene adipate) (molecular weight: 1,000), 8.0 g of 1,4-butylene glycol, 1.1 g of the reaction product obtained in Example 13, 103.7 g of MDI and 225 g of tetrahydrofuran. After reacting them at 65° C. for 10 hours, 375 g of tetrahydrofuran were added to give a solid content of 20 percent.

The resultant phosphoric-acid-modified polyurethane resin had an acid value of 1.9 (polymer) and a number average molecular weight of 52,000.

Magnetic tapes were then produced in a similar manner to Example 14.

EXAMPLE 25

A flask as in Example 15 was charged with 226.1 of poly(1,4-butylene adipate) (molecular weight: 1,000), 60.7 g of neopentyl glycol and 7.1 g of the reaction product obtained in Example 13. The contents were then heated to 110° C.

Under similar conditions to Example 16, 206 g of MDI were then added and reacted and the reaction mixture was allowed to age.

The thus-obtained resin had an acid value of 3.1 and a number average molecular weight of 62,000 and was in a solid form. It was dissolved in methyl ethyl ketone to give a solid content of 20 percent, thereby providing a resin solution.

Magnetic tapes were then produced in a similar manner to Example 14.

EXAMPLE 26

A flask as in Example 15 was charged with 226.1 g of poly(1,4-butylene adipate) (molecular weight: 1,000), 60.7 g of neopentyl glycol, 7.1 g of the reaction product obtained in Example 13 and 5.7 g of tri-nbutylamine. The contents were then heated to 110° C.

Under similar conditions to Example 16, 206 g of MDI were then added and reacted and the reaction mixture was allowed to age.

The thus-obtained resin had an acid value of 3.0 and a number average molecular weight of 59,500 and was in a solid form. It was dissolved in methyl ethyl ketone to give a solid content of 20 percent, thereby providing a resin solution.

Magnetic tapes were then produced in a similar manner to Example 14.

EXAMPLE 27

In a similar manner to Example 25, a phosphoric-acid-modified polyurethane resin solution was prepared. It was neutralized with triethylamine in an amount equivalent to the acid value. The solution was diluted with methyl ethyl ketone to give a solid content of 20 percent.

Magnetic tapes were then produced in a similar manner to Example 14.

COMPARATIVE EXAMPLE 1

"Estane ® 5701F1" (trade name, product of the BFGoodrich Company) was dissolved in a 70:30 mixture of tetrahydrofuran and cyclohexanone to give a solid content of 20 percent.

Using 750 g of the resin solution, 600 g of cobalt modified Y-$Fe_2O_3$ ("A-3000," trade name; product of Titan Kogyo K.K.), 650 g of cyclohexanone and 350 g of methyl ethyl ketone, magnetic tapes were then produced in a similar manner to Example 14.

COMPARATIVE EXAMPLE 2

"Estane ® 5703" (product of the BFGoodrich Company) was dissolved in methyl ethyl ketone to give a solid content of 20 percent.

Magnetic tapes were then produced in a similar manner to Example 14.

COMPARATIVE EXAMPLE 3

A 1 L separable flask equipped with a thermometer, a stirrer and a nitrogen gas inlet tube was charged with 325.4 g of poly(1,4-butylene adipate) (molecular weight: 1,000), 23.4 g of 1,4-butylene glycol and 6.1 g of "Epicoat 1001." After heating the contents to 80° C., 145.1 g of MDI which had been heated to 80° C. were added and the resultant mixture was vigorously stirred. Thereafter, the reaction mixture was transferred into a vat, in which it was allowed to age at 120° C. for 10 hours. A solid resin having a number average molecular weight of 44,000 was obtained.

Magnetic tapes were then produced in a similar manner to Example 14.

COMPARATIVE EXAMPLE 4

A flask as in Example 14 was charged with 8.4 g of poly(1,4-butylene adipate) (molecular weight: 1,000), 2.1 g of 1,4-butylene glycol, 1.4 g of 2,2-dimethylolpropionic acid, 38.1 g of MDI, 270 g of tetrahydrofuran and 270 g of toluene. After reacting them at 80-85° C. for 12 hours, 100 g of tetrahydrofuran were added to give a solid content of 20 percent.

The resultant carboxyl-modified polyurethane resin had an acid value of 3.5 and a number average molecular weight of 52,000.

Magnetic tapes were then produced in a similar manner to Example 14.

COMPARATIVE EXAMPLE 5

A flask as in Example 14 was charged with 6.6 g of poly(1,4-butylene adipate) (molecular weight: 1,000), 2.5 g of 1,4-butylene glycol, 2.8 g of 5-sodiumsulfo-1,3-di(2-hydroxyethyl) isophthalate (product of Sumitomo Chemical Co., Ltd.), 38.1 g of MDI, 270 g of tetrahydrofuran and 270 g of toluene. After reacting them at 80°-85° C. for 12 hours, 100 g of methyl ethyl ketone were added to give a solid content of 20 percent.

The resultant sodium sulfonate-modified polyurethane resin had a sodium sulfonate ($-SO_3Na$) concentration of 0.05 mg eq/g and a number average molecular weight of 48,000.

Magnetic tapes were then produced in a similar manner to Example 14.

COMPARATIVE EXAMPLE 6

A flask as in Example 14 was charged with 468 g of dimethylformaide and 115 g of a hydroxyl-terminated polyurethane ("Estane ® 5703," trade name; product of the BFGoodrich Company). After dissolving the latter in the former at 80° C. over 2 hours, 8.2 g of the compound represented by the following formula:

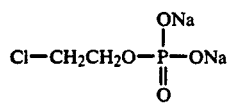

and 1.6 g of pyridine were added. A dehydrochlorination reaction was then conducted at 80° C. for 3 hours, whereby phosphoric acid groups were introduced into both ends of each polyurethane chain, respectively. Subsequent to neutralization with caustic soda, the polymer was poured into a large volume of methanol. Further, the polymer was washed several times with methanol.

After drying the polymer under reduced pressure, methyl ethyl ketone was added to adjust the solid content to 20 percent.

The sodium-phosphate-modified polyurethane resin thus obtained had a sodium phosphate residium

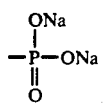

concentration of 1.8 mg eq/g and a number average molecular weight of 58,000.

Magnetic tapes were then produced in a similar manner to Example 14.

With respect to each of the magnetic tapes obtained in the above examples and comparative examples, its surface gloss (60° reflectivity) and square ratio (Br/Bs) were measured to investigate the dispersion and magnetic characteristics, respectively. In addition, its abrasion resistance was also measured to investigate the durability. The results are summarized in Table 1.

The above properties were measured in accordance with the following testing methods, respectively.

Surface Gloss

The surface glass (60° reflectivity) of the magnetic coating layer of each magnetic tape was measured using a gloss meter ("AU-SCH-2D-GU3," trade name for a digitized automatic colorimetric color difference meter manufactured by Toho Rika Kogyo K.K.).

Better dispersion gives a higher gloss value.

Square Ratio

Measurement was conducted using "Model 3257," trade name for an automatic recording apparatus for d.c. magnetization characteristics manufactured by Yokogawa Electric Corporation.

Better dispersion gives a higher square ratio.

Abrasion Resistance

A crock testing machine of the JSPSR (Japan Society for Promotion of Scientific Research) type manufactured by Daiei Kagaku Keiki Seisakusho K.K. was used. In an environment of 23° C. and 65 percent RH, the surface of the magnetic coating layer of each magnetic tape was reciprocated and rubbed 200 times under a load of 100 g against a chromium-plated metal cylinder having a diameter of 15 mm. Then, the percentage of any rubbed-off surface area was determined based on the total surface area subjected to the rubbing.

TABLE I

| | Surface Glass, % | Square Ratio | Abrasion Resistance, % |
|---|---|---|---|
| Example 14 | 88 | 0.84 | 3.5 |
| Example 15 | 93 | 0.83 | 4.0 |
| Example 16 | 92 | 0.84 | 1.9 |
| Example 17 | 90 | 0.81 | 1.6 |
| Example 18 | 85 | 0.82 | 1.3 |
| Example 19 | 74 | 0.78 | 2.1 |
| Example 20 | 70 | 0.75 | 5.0 |
| Example 21 | 80 | 0.80 | 4.7 |
| Example 22 | 90 | 0.82 | 3.4 |
| Example 23 | 95 | 0.85 | 3.2 |
| Example 24 | 92 | 0.83 | 2.5 |
| Example 25 | 93 | 0.82 | 3.5 |
| Example 26 | 96 | 0.85 | 3.3 |
| Example 27 | 98 | 0.86 | 3.4 |
| Comp. Ex. 1 | 16 | 0.68 | 1.4 |
| Comp. Ex. 2 | 20 | 0.72 | 3.2 |
| Comp. Ex. 3 | 17 | 0.65 | 2.4 |
| Comp. Ex. 4 | 50 | 0.74 | 3.5 |
| Comp. Ex. 5 | 68 | 0.76 | 8.0 |
| Comp. Ex. 6 | 52 | 0.74 | 5.2 |

It is clearly envisaged from Table I that the magnetic tapes according to the present invention, namely, those of Examples 14-27 are all excellent in dispersion and especially the magnetic tapes of Examples 16-18 in which phosphoric-acid-modified and epoxy-modified polyurethane resins were used respectively are also excellent in durability.

While in accordance with the Patent Statutes, the best mode and preferred embodiment has been set forth, the scope of the invention is not limited thereto, but rather by the scope of the attached claims.

What is claimed is:

1. A magnetic recording medium, comprising:
    a magnetic layer composed principally of magnetic particles and a binder, at least a portion of said binder being a polyurethane resin having a weight average molecular weight of from about 10,000 to about 250,000 and synthesized from a reactant mixture of at least one phosphorus compound, an epoxy compound having at least two epoxy groups, one epoxy group and at least one hydroxyl group, or combinations thereof,
    a polyisocyanate, and
    a polyfunctional hydroxyl compound having a molecular weight by end group analysis of from about 300 to about 10,000, and
    optionally, a chain extender,
    said urethane resin containing one phosphoric acid group or one residual group derived from phosphoric acid per 3,000 to about 200,000 number average molecular weight of said urethane resin, said urethane resin having a weight average molecular weight of from about 10,000 to about 350,000;
    said phosphorus compound being a phosphorus compound (a) represented by the structural formula set forth below, or a phosphorus compound (b) represented by the structural formula set forth below, or a phosphorus compound (c) set forth by the structural formula set forth below, said phosphorus compound (a) being a compound ($a_1$) alone or a mixture of the compound (a₁) and another compound (a₂):

Compound (a₁):

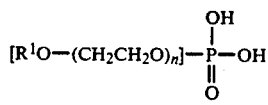

Compound (a₂):

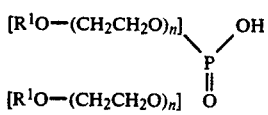

wherein $R^1$ is a hydrogen atom, a phenyl group, an alkyl group having 1–40 carbon atoms, or an alkylphenyl group having 1–40 carbon atoms, and n is an integer of 0–30;

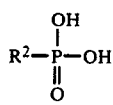

wherein $R^2$ is a phenyl group, an alkyl group having 1–40 carbon atoms, or an alkylphenyl group having 1–40 carbon atoms; and wherein phosphorus compound (c) is

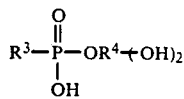

where $R^3$ is an aromatic or an alkyl substituted aromatic having from 6 to 40 carbon atoms, and $R^4$ is a disubstituted alkyl having from 1 to 12 carbon atoms.

2. A magnetic recording medium according to claim 1, wherein said optional chain extender is essentially a difunctional chain extender, wherein said polyurethane resin contains one phosphoric acid group or one residual group derived from phosphoric acid per 12,000 to about 200,000 number average molecular weight of said polyurethane resin, and wherein said polyfunctional hydroxy compound is a polyether polyol, a polyester polyol, a polycarbonate polycarbamyl, or ethanol-2,2′-[(1-methylethylidene)bis(4,1-phenyleneoxy)]bis.

3. A magnetic recording medium according to claim 2, wherein said weight average molecular weight of said polyurethane is from about 20,000 to about 150,000, wherein said phosphoric acid groups or residual groups derived from phosphoric acid contained within said polyurethane resin has been at least partially neutralized with a base, and wherein said phosphorous compound (c) is

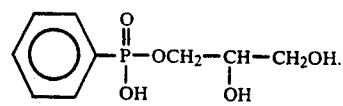

4. A magnetic recording medium according to claim 3, wherein said polyfunctional hydroxy compound is ethanol-2,2,-[(1-methylethylidene)bis(4,1-phenyleneoxy)]bis.

5. A magnetic recording medium according to claim 3, wherein said polyfunctional hydroxy compound is a polyester polyol made from a glycol having from 2 to 8 carbon atoms and neopentyl isophthalic acid.

6. A magnetic recording medium according to claim 3, wherein said polyurethane resin is neutralized with a piperidine compound or a derivative thereof, or piperadinone or a derivative thereof.

* * * * *

UNITED STATES PATENT AND TRADEMARK OFFICE
CERTIFICATE OF CORRECTION

PATENT NO. : 5,273,826
DATED : December 28, 1993
INVENTOR(S) : Masahiko Yasuda et al.

It is certified that error appears in the above-indentified patent and that said Letters Patent is hereby corrected as shown below:

In claim 1, column 21, line 20, delete "," and substitute therefore --.--.

In claim 1, column 21, line 21, insert the following --Phosphorus Compound (b):-- before the formula.

In claim 4, line 3, after "ethanol-2,2", delete "," and substitute therefor --'--.

Signed and Sealed this

Twelfth Day of July, 1994

Attest:

BRUCE LEHMAN

Attesting Officer     Commissioner of Patents and Trademarks